United States Patent [19]
Costa Pereira et al.

[11] Patent Number: 6,109,321
[45] Date of Patent: Aug. 29, 2000

[54] TIRE CARCASS ANCHORING

[75] Inventors: Pedro Costa Pereira, Clermont-Ferrand; Yves Herbelleau, Riom, both of France

[73] Assignee: Compagnie Generale des Establissements Michelin-Michelin & Cie, Clermont-Ferrand Cedex, France

[21] Appl. No.: 09/083,291

[22] Filed: May 22, 1998

Related U.S. Application Data

[60] Provisional application No. 60/058,356, Sep. 10, 1997.

[30] Foreign Application Priority Data

May 27, 1997 [FR] France .................................. 97 06574

[51] Int. Cl.[7] .......................... B60C 19/02; B60C 15/00; B60C 9/08
[52] U.S. Cl. ........................ 152/547; 152/547; 152/549; 152/550
[58] Field of Search ..................... 152/550, 539, 152/547, 549, 555, 552, 564

[56] References Cited

U.S. PATENT DOCUMENTS

| | | | |
|---|---|---|---|
| 3,815,652 | 6/1974 | Pouilloux . | |
| 5,160,384 | 11/1992 | Ueyoko et al. | 152/525 |
| 5,660,656 | 8/1997 | Herbelleau | 152/547 |
| 5,674,331 | 10/1997 | Saeki et al. | 152/552 |

FOREIGN PATENT DOCUMENTS

| | | |
|---|---|---|
| 378261 | 9/1907 | France . |
| 158856 | of 0000 | Germany . |
| 579877 | 6/1933 | Germany . |
| 320535 | of 0000 | United Kingdom . |
| 990524 | 4/1965 | United Kingdom . |
| WO8902492 | 3/1989 | WIPO . |

*Primary Examiner*—Michael W. Ball
*Assistant Examiner*—Barbara J Musser
*Attorney, Agent, or Firm*—Baker Botts, L.L.P.

[57] ABSTRACT

A tire having a crown, two sidewalls and two beads, a carcass casing anchored in the two beads and having cords worked back and forth next to each other aligned circumferentially with, in each bead, loops each connecting back and forth cord portions, and in each bead, carcass casing anchoring cords oriented circumferentially and axially bordering the circumferential rows of the back and forth arrangement of carcass casing cords, wherein the carcass casing consists of cords forming two or three circumferential rows separated, at least in the beads and the sidewalls, by a filler.

11 Claims, 1 Drawing Sheet

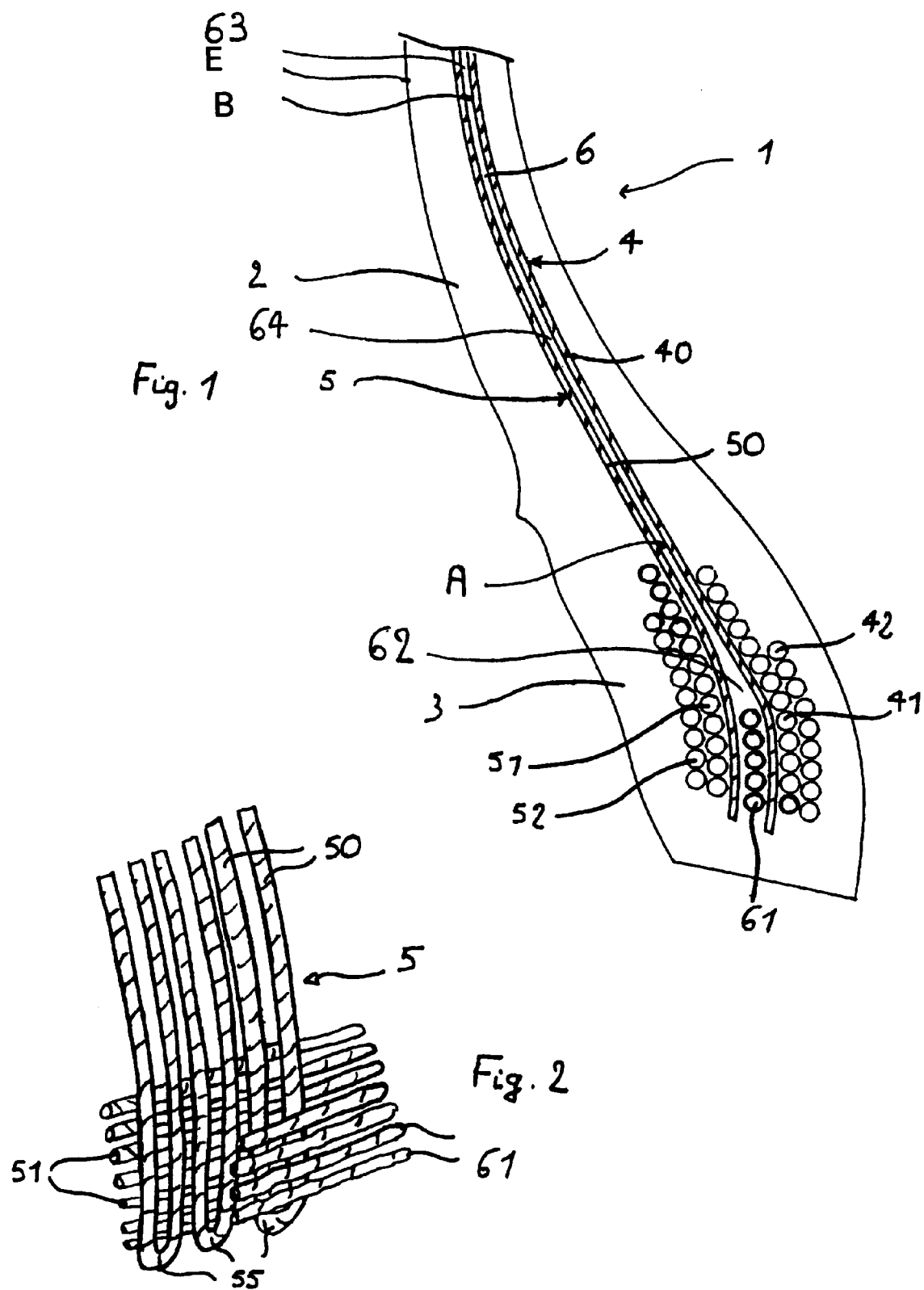

TIRE CARCASS ANCHORING

This application is entitled to the benefit of provisional application Ser. No. 60/058,356, filed Sep. 10, 1997.

BACKGROUND OF THE INVENTION

The present invention relates to tires and more particularly the way in which the carcass reinforcement cords are arranged and the way in which they are anchored in the beads.

U.S. Pat. No 5,660,656 has recently proposed a novel type of tire carcass casing and a way of anchoring it in its two beads. A tire, in these applications, comprises a crown, two sidewalls and two beads, a carcass casing anchored in the two beads comprising cords worked back and forth next to each other aligned circumferentially with, in each bead, loops each connecting back and forth cord portions, and in each bead, means of anchoring the carcass casing comprising piles of cords oriented circumferentially and axially bordering said circumferential rows of said back and forth arrangement of carcass casing cords. In these tires, the taking up of the tension which is developed in the carcass upon inflation is solely achieved by the adherence of each carcass cord laterally with the anchoring means.

These applications also propose, when the carcass casing needs to be so strong that it is no longer geometrically possible to arrange the cords in the beads in a single circumferential row, that a single circumferential back and forth row be conserved in each sidewall and that this row be split into two rows which progressively diverge axially from one another from a sidewall towards the base of a bead.

The advantage of this solution is that it maintains a great deal of flexibility in the sidewalls while at the same time enabling the use of a higher density of cords, therefore making it possible to increase the number of carcass cords above which it becomes necessary to resort to a separate additional carcass on account of a lack of space in the bead in which to house all the cords.

It has been observed that it is very tricky to produce such a tire with a carcass casing made up of a circumferential row of cords in the crown and in the sidewalls which splits into two at the beads. This is because the industrialization constraints are such that it is difficult to prevent a certain number of the cords coming into contact with one another, and this can lead to endurance problems.

The object of the present invention is to overcome this problem.

SUMMARY OF THE INVENTION

In what follows, the term "cord" is understood to mean both monofilaments and multifilaments, or assemblies such as ply cords, twisted cords, or even any type of equivalent structure irrespective of the material and treatment of these cords, which may, for example, have a surface treatment or a coating or a preliminary coating with adhesive to encourage them to stick to the rubber.

The term "elastic modulus" for a rubber blend is understood to be a secant extension modulus obtained at a deformation in uni-axial extension of the order of 10% at room temperature.

A tire according to the invention comprises a crown, two sidewalls and two beads, a carcass casing anchored in the two beads and comprising first cords worked back and forth next to each other aligned circumferentially with, in each bead, loops each connecting the back and forth cord portions, and in each bead, means of anchoring the carcass casing comprising second cords oriented circumferentially and axially bordering the circumferential rows of the back and forth arrangement of carcass casing first cords, these anchoring means taking up the tension which is developed in the carcass upon inflation solely by the adherence of each carcass cord laterally with them, and wherein said carcass casing consists essentially of first cords forming two or three circumferential rows separated, at least in the beads and the sidewalls, by a filler.

According to a preferred embodiment, the filler is supplemented, in each bead, by third cords oriented circumferentially.

The carcass casing according to the invention has the advantage of allowing a larger average amount of space between the cords and this makes it possible, even if this average amount of space fluctuates, to better ensure that the cords are actually separated by a rubber blend of coating or of filler. Alternatively, thanks to the possibility of using more cords without these touching, for a given carcass casing strength, it is possible to use cords of a smaller cross section than would have been used in the solutions outlined earlier, and this leads to this casing being anchored more firmly in the bead, especially under high loadings.

As a preference, the filler comprises a first rubber blend with a very high elastic modulus arranged in the region where the carcass casing is anchored and a second rubber blend with low elastic modulus arranged in the crown region and in at least part of the sidewalls adjacent to the crown.

The first rubber blend with very high elastic modulus has an elastic modulus exceeding 20 MPa and preferably exceeding 30 MPa, and the second rubber blend with low elastic modulus has an elastic modulus below 6 MPa and preferably between 2 and 5 MPa.

DESCRIPTION OF THE DRAWINGS

The invention is now described with the aid of the following drawings:

FIG. 1 is a radial section essentially showing a sidewall and a bead of a tire according to the invention;

FIG. 2 is a perspective view diagrammatically showing the arrangement of some of the reinforcing cords.

DESCRIPTION OF PREFERRED EMBODIMENTS

FIG. 1 is a radial section essentially showing a sidewall 2 and a bead 3 of a tire 1 according to the invention. The carcass casing consists of two circumferential rows 4, 5 of first cords corresponding, in this figure, to the two portions of cords 40 and 50. In the case of the tire according to the invention described here, the two portions of the cords 40 and 50 are oriented radially in the sidewall 2 and consist of aramid fibers. The portions of first cords 40 and 50 are arranged parallel to each other and separated by a filler 6. The two circumferential rows 4 and 5 of first cords are anchored in the bead 3 by piles 41, 42, 51, 52 of second circumferential cords arranged axially on either side of the portions of first cords 40 and 50. As a preference, in the region of the bead 3, the filler 6 is supplemented by at least one pile 61 of third circumferential reinforcing cords. The piles of second and third circumferential reinforcing cords may advantageously be windings of cords. The circumferential and radial cords are separated from one another by some rubber blend to avoid any direct contact of one cord with another. The lateral adherence between each carcass cords 40 and 50 and the piles of circumferential cords achieves the taking up of tension which is developed in these carcass cords 40 and 50 upon inflation.

The filler 6 in the example shown is composed of three rubber blends of varying rigidity. A first blend 62 is in the region where the carcass casing is anchored between the two circumferential rows of first cords as far as the limit A. This first blend has a very high elastic modulus exceeding 30 MPa. There is a second rubber blend 63 in the crown region and in part of the sidewalls 2 adjacent to the crown, namely in the shoulder and in all the part radially above a limit B that lies more or less at the equator E. The "line" E that corresponds to the greatest axial width of the tire is known as the "equator". This second blend has a low elastic modulus of the order of 2 to 5 MPa. Finally, there is a third blend 64 in an intermediate region between the previous two limits A and B. This third blend has an intermediate elastic modulus of between 6 and 20 MPa.

The fact that there is the first rubber blend of high elastic modulus in the anchoring region contributes to the good mechanical strength of the bead. Furthermore, the second rubber blend with low rigidity in the crown region and in the part of the sidewalls adjacent to the crown, above the equator, a region where a great deal of bending takes place, makes it possible for the flexural rigidity of the sidewalls not to be increased too markedly on account of the presence of the two or three circumferential rows of first cords.

FIG. 2 is a perspective view of one of the circumferential rows of first cords, the row 5, in which only the reinforcing cords have been depicted. This figure reveals the circumferential row 5 of first cords which consists of portions of cords 50. At their radially lower ends, the portions of cord 50 form loops 55 which are side by side and located in the bead 3. These loops 55 are adjacent and do not overlap. Axially on either side of the circumferential row 5 of first cords, are depicted just the piles 61 and 51 which are axially directly adjacent to this row 5.

To improve the clarity of the drawing, only the circumferential row 5 of first cords and two piles have been depicted, but the circumferential row 4 of first cords have the same arrangement of portions of cord 40.

In the example shown, the two circumferential rows are separated over their entire length by the filler 6. It is also possible to restrict the splitting of the carcass casing into two or three circumferential rows to just the beads and the sidewalls and to have just one or two rows in the crown of the tire. This is because in this region the mechanical stresses to which the carcass casings are subjected are appreciably lower than in the region of the sidewalls.

The tire according to the invention may advantageously be constructed on a rigid core that dictates the shape of its interior cavity. All the constituent parts of the tire are laid over this core in the order required by the final design, these components being arranged directly in their final position without the construction needing to be shaped at any time. This construction can advantageously use the apparatus described in patents EPO 243 851 for laying the carcass cords and EPO 264 600 for laying the rubber blends. The tire can then be molded and vulcanized as explained in U.S. Pat. No. 4,895,692.

The tire according to the invention has two attractive advantages.

First of all, the risk of one cord in the portions of cords 40 and 50 of the circumferential rows 4 and 5 of first cords coming into contact with another is considerably reduced. This in particular makes it possible to slacken the running tolerances for industrial production, this being the yardstick for reliability and lower cost. This also makes the endurance of the tire more reliable.

Also, for a given breaking strength of carcass casing, i.e. for a given total cross section of portions of first cords 40 and 50, the presence of two circumferential rows 4 and 5 of parallel cords makes it possible, compared with the solution recommended in U.S. Pat. No. 5,660,656 where there is just one circumferential row of cords in the crown and the sidewalls which is split into two in the beads, to use a higher number of cords. As a result, the diameter of the cords used is smaller and the total area for contact between these cords and the adjacent rubber blends is higher, which has the advantage of improving the mechanical strength of the bead, especially when it is highly stressed.

It has also been observed that the presence in the sidewalls 2 of a carcass casing composed of two or three parallel circumferential rows did not detrimentally increase the flexural rigidity of the sidewalls. This result is especially connected with the presence between the circumferential rows of a rubber blend of low rigidity. By contrast, if the number of rows of cords is increased to more than three, the flexural rigidity could become excessive.

We claim:

1. A tire comprising a crown, two sidewalls and two beads, first cords worked back and forth next to each other, aligned circumferentially and anchored in the two beads with, in each bead, loops each connecting back and forth cord portions and, in each bead, the anchoring of said first cords comprising second cords oriented circumferentially and axially bordering said circumferential row of the first back and forth arrangement of cords, said second cords taking up the tension which is developed in the first cords upon inflation solely by the adherence of each first cord laterally with said second cords, wherein at least throughout the beads and sidewalls the first cords form two single alignments of circumferential rows separated by a filler and wherein the filler comprises a first rubber blend with a very high secant modulus of elasticity at 10% elongation arranged in the region where the first cords are anchored and a second rubber blend with low modulus arranged in the crown region and in at least part of the sidewalls adjacent to the crown.

2. A tire comprising a crown, two sidewalls and two beads, first cords worked back and back next to each other, aligned circumferentially and anchored in the two beads with, in each bead, loops each connecting back and forth cord portions and, in at least one bead, the anchoring of said first cords comprising second cords oriented circumferentially and axially bordering said circumferential row of the first back and forth arrangement of cords, said second cords taking up the tension which is developed in the first cords upon inflation solely by the adherence of each first cord laterally with said second cords, wherein at least throughout the beads and sidewalls the first cords form three single alignments of circumferential rows separated by a filler and wherein the filler comprises a first rubber blend with a very high secant modulus of elasticity at 10% elongation arranged in the region where the first cords are anchored and a second rubber blend with low modulus arranged in the crown region and in at least part of the sidewalls adjacent to the crown.

3. A tire as claimed in claim 1, wherein said filler is supplemented in each bead by third cords oriented circumferentially.

4. A tire as claimed in claim 1, wherein the first rubber blend with very high modulus exceeds 20 MPa, and wherein the second rubber blend with low modulus is below 6 MPa.

5. A tire as claimed in claim 4 in which the first rubber blend has a modulus which exceeds 30 MPa.

6. A tire as claimed in claim 4 in which the second rubber blend has a modulus between 2 and 5 MPa.

7. A tire as claimed in claim 1, wherein the filler further comprises a third rubber blend with an intermediate modulus in part of the sidewall between the region in which the first cords are anchored, which is where the first rubber blend is, and the part of the sidewall adjacent to the crown, which is where the second rubber blend is.

8. A tire as claimed in claim 2, wherein said filler is supplemented in each bead by third cords oriented circumferentially.

9. A tire as claimed in claim 2, wherein the first rubber blend with very high modulus exceeds 20 MPa, and wherein the second rubber blend with low modulus is below 6 MPa.

10. A tire as claimed in claim 9 in which the first rubber blend has a modulus which exceeds 30 MPa.

11. A tire as claimed in claim 9 in which the second rubber blend has a modulus between 2 and 5 MPa.

* * * * *

UNITED STATES PATENT AND TRADEMARK OFFICE
CERTIFICATE OF CORRECTION

PATENT NO. : 6,109,321
DATED : August 29, 2000
INVENTOR(S) : Costa Pereira et al.

It is certified that error appears in the above-identified patent and that said Letters Patent is hereby corrected as shown below:

Column 4,
Line 44, "back" (second occurrence) should read -- forth --

Signed and Sealed this

Twenty-seventh Day of April, 2004

JON W. DUDAS
*Acting Director of the United States Patent and Trademark Office*